United States Patent

[11] 3,576,363

| [72] | Inventor | Anton Theer |
| | | Munich, Germany |
| [21] | Appl. No. | 725,340 |
| [22] | Filed | Apr. 30, 1968 |
| [45] | Patented | Apr. 27, 1971 |
| [73] | Assignee | Agfa-Gevaert Aktiengesellschaft |
| | | Leverkusen, Germany |
| [32] | Priority | May 27, 1967 |
| [33] | | Germany |
| [31] | | A55706 |

[54] CINEMATOGRAPHIC APPARATUS
12 Claims, 3 Drawing Figs.

[52] U.S. Cl. .................................................. 352/191,
352/176, 352/155
[51] Int. Cl. ..................................................... G03b 1/22
[50] Field of Search ........................................ 352/92,
170, 176, 174, 191, 184, 155; 116/114.10; 200/52

[56] References Cited
UNITED STATES PATENTS

| 2,011,272 | 8/1935 | Duggan ..................... | 200/52 |
| 3,472,583 | 10/1969 | Blaschke ..................... | 352/171 |

FOREIGN PATENTS

| 458,510 | 12/1936 | Great Britain ............... | 352/155 |

*Primary Examiner*—John M. Horan
*Assistant Examiner*—Alan Mathews
*Attorney*—Michael S. Striker ABSTRACT: A motion picture camera or projector wherein the pulldown of the film transporting mechanism moves from a first to a second position in response to removal of film from the path in which the film is advanced from the supply reel to the takeup reel. The pulldown thereby permits opening of a switch which is connected in circuit with the motor for the pulldown and with the light meter of the exposure control in a camera. The switch closes in automatic response to insertion of a fresh supply of film.

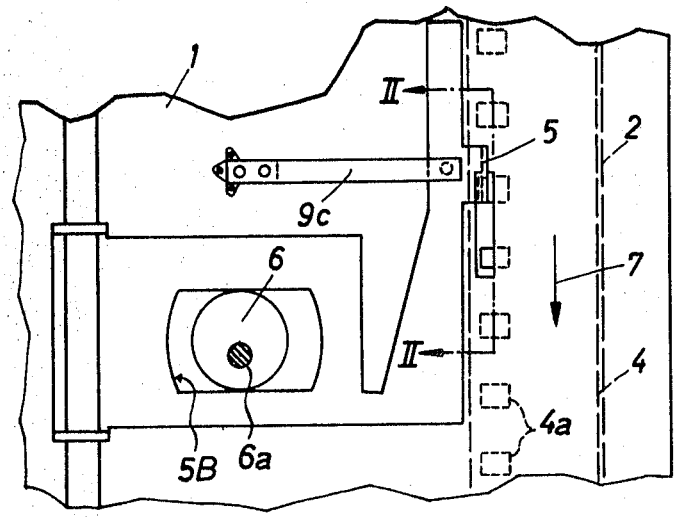
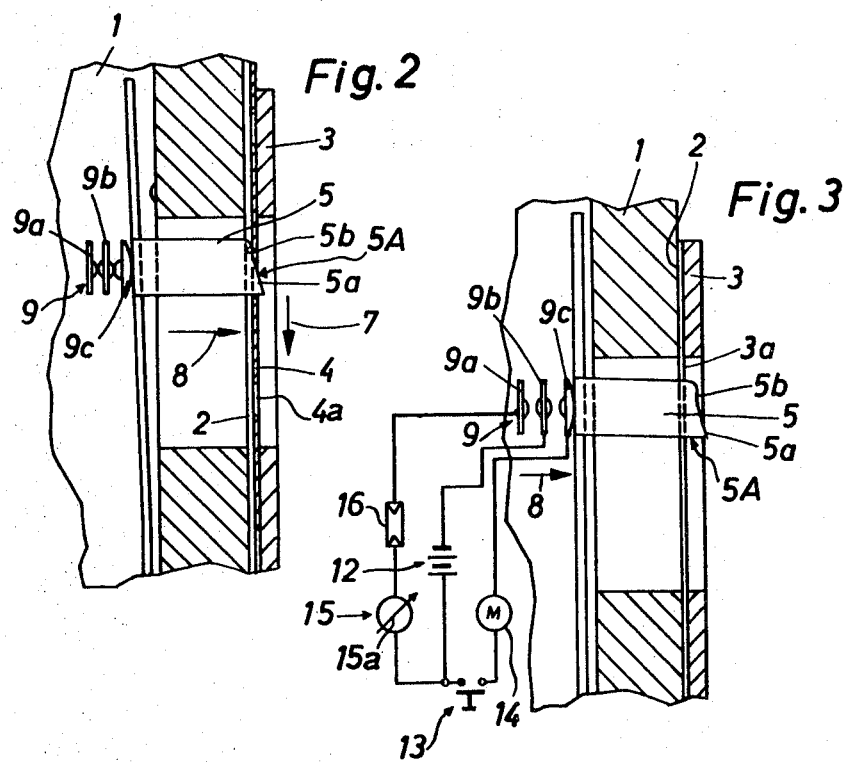

CINEMATOGRAPHIC APPARATUS

BACKGROUND OF THE INVENTION

The present invention relates to cinematographic apparatus in general, especially to motion picture cameras for 8-millimeter film. More particularly, the invention relates to improvements in cinematographic apparatus of the type comprising a source of electrical energy and at least one electrical component which receives current from such source.

A modern 8-millimeter motion picture camera comprises one or more electric circuits, for example, a first circuit for the motor of the film transporting mechanism, a second circuit for the moving coil instrument of the exposure control, a flash circuit and/or others. It is desirable to open the circuit or circuits when the camera is not in use, particularly when the camera is put away for extended periods of time, because the charges of batteries are weakened by creep currents. On the other hand, it is desirable to complete the electric circuit of the exposure control prior to actual film transport so that the exposure control can furnish readings which facilitate proper adjustment of the shutter and/or diaphragm or that the output member of a moving-coil instrument automatically sets the shutter and diaphragm prior to actuation of the trigger. Moreover, the exposure control requires a certain amount of time to operate properly and, therefore, it is desirable to complete the circuit of the exposure control at least shortly before the trigger is depressed to make the first exposure. This insures that the first exposure or the first series of exposures is just as satisfactory as the subsequent ones.

SUMMARY OF THE INVENTION

It is an object of the present invention to provide a cinematographic apparatus which comprises one or more electric circuits and wherein such circuit or circuits are opened in automatic response to removal of film from the apparatus so that the source of electrical energy in the apparatus cannot dissipate energy when the apparatus is not in use.

Another object of the invention is to provide an apparatus of the just outlined characteristics wherein the circuit or circuits are automatically completed or ready to be completed in response to insertion of fresh film.

A further object of the invention is to provide a motion picture camera wherein the insertion of a fresh supply of film and proper threading of fresh film into the film path automatically completes the circuit of the exposure control and prepares the circuit of the film transporting mechanism for completion, and wherein such operations are carried out by resorting to a minimal number of simple, compact and inexpensive parts which can be readily installed in expensive as well as in popularly priced motion picture cameras.

The improved apparatus comprises a housing, guide means provided in the housing and defining a film path, a film transporting mechanism including a film transporting member movable from a first to a second position in response to removal of film from the film path, and electric circuit means including normally open switch means which is closed in response to movement of the film transporting member to first position, i.e., in response to insertion and proper threading of film.

The circuit means may include a source of electrical energy, a moving coil instrument which forms part of an exposure control and a motor for the film transporting member. The circuit of the moving coil instrument is preferably completed in automatic response to closing of the switch means and the motor circuit can be completed on closing of such switch means in response to actuation of the customary shutter release trigger. The motor may also drive the shutter.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of a specific embodiment with reference to the accompanying drawing.

BRIEF DESCRIPTION OF THE DRAWING

FIG. 1 is a fragmentary elevational view of the film transporting mechanism in a motion picture camera which embodies my invention;

FIG. 2 is an enlarged sectional view as seen in the direction of arrows from the line II—II of FIG. 1;

FIG. 3 is a similar sectional view but showing the pulldown of the film transporting mechanism in a position its claw assumes when the film is removed from the camera.

DESCRIPTION OF THE PREFERRED EMBODIMENT

FIG. 1 illustrates a portion of a motion picture camera for 8-millimeter film. The camera comprises a housing 1 which accommodates or includes a guide 2 defining a path for motion picture film 4. The film 4 advances along such path from a supply reel to a takeup reel, not shown. A pressure plate 3 (FIGS. 2 and 3) is provided to maintain the film 4 in a predetermined plane while the film advances behind the objective, not shown in FIG. 1.

The film transporting mechanism comprises a film transporting member 5, here shown as a pulldown having a claw 5A which can enter the perforations 4a of film 4 to advance the latter in the guide 2. An electric motor 14 (shown only in FIG. 3) drives a shaft 6a for an eccentric 6 which is turntable in a suitable cutout 5B of the pulldown 5 to impart to the claw 5A requisite movements which bring about intermittent advance of film 4 in a manner well known from the art of cameras. When the motor 14 drives the shaft 6a and eccentric 6, the claw 5A of the pulldown 5 reciprocates in and counter to the direction indicated by arrow 7. An inclined cam face 5a on the claw 5A causes the latter to leave the adjoining perforation 4a when the pulldown 5 moves upwardly, as viewed in FIG. 1 or 2. The inclined cam face 5a is adjacent to a stop face 5b of the claw 5A; this stop face 5b determines the extent to which the tip of the claw 5A can penetrate into the next perforation 4a when the pulldown 5 is caused to move downwardly (arrow 7).

The pulldown 5 is permanently biased in the direction indicated by arrow 8 (FIGS. 2 and 3). Such bias is supplied by a spring 9c which constitutes one elastic contact of a normally open electric switch 9. The latter comprises two additional contacts 9a, 9b and is connected in an electric circuit which is shown schematically in FIG. 3. When the film 4 is properly threaded between the guide 2 and pressure plate 3, it moves the pulldown 5 from the position shown in FIG. 3 to that shown in FIG. 2 whereby the pulldown automatically closes the switch 9 by causing the contact 9c to move into current-conducting engagement with the contract 9b and to move the contact 9b into current-conducting engagement with the contact 9a. It will be seen that, when the film 4 is properly threaded between the parts 2 and 3, the claw 5A of the pulldown 5 can move in and counter to the direction indicated by arrow 8 but only to the extent determined by the film. This is the first or operative position of the claw 5A. When the film 4 is removed from its path in the guide 2, the elastic contact 9c of the switch 9 moves the pulldown 5 to the second position shown in FIG. 3 whereby the claw 5A extends into a suitable cutout 3a in the pressure plate 3. It is clear that the bias of the elastic contact 9c can be assisted by an additional spring (not shown) which tends to move the pulldown 5 from the position of FIG. 2 to that shown in FIG. 3.

FIG. 3 shows the electric circuit which includes the switch 9. The contacts 9a, 9b are in series with a battery 12 or another suitable source of electrical energy and with an element 15 of a built-in exposure control. The element 15 may be a customary moving coil instrument in series with a photosensitive resistor 16 which is exposed to scene light and thus causes the output member or needle 15a of the instrument 15 to assume an angular position which is a function of scene brightness. The output member 15a may furnish readings which can be perused for proper adjustment of the diaphragm and/or shutter, or it may be directly coupled to the shutter and/or diaphragm in a manner well known from the art of cameras. The contacts 9b, 9c are in series with the battery 12 and with the motor 14 of the film transporting mechanism. The motor circuit further includes a master switch 13 which is closed in response to actuation of the shutter release trigger, not shown. The motor 14 also serves to drive the shutter, not shown.

When the film is removed from the guide 2, the claw 5A is moved to the position shown in FIG. 3 and both branches of the electric circuit are open so that the motor 14 cannot be started at all, even in response to closing of the master switch 13. When the user inserts a fresh film 4, the switch 9 closes automatically so that the exposure control is operative and the motor 14 is ready to be started in response to closing of the master switch. Thus, the pulldown 5 of the film transporting mechanism acts as an intermediary element between the switch 9 and the film 4 to close the switch in response to proper threading of film into the film path of the camera and without necessitating the provision of separate parts for closing of the switch 9.

It is clear that the structure shown in the drawing is susceptible of many modifications without departing from the spirit of my invention. For example, the switch 9 can be connected in circuit only with the motor 14 or only with the exposure control. Also, the invention can be embodied in a movie projector wherein the pulldown advances exposed and developed film from a supply reel to a takeup reel.

The cinematographic apparatus of my invention differs from known apparatus wherein the film actuates detectors which track the film and actuate switches. The main difference between such conventional apparatus and my apparatus is that the latter employs for actuation of the switch 9 a member 5 which also performs another important function, namely, it transports the film along the film path. Thus, the detectors of conventional apparatus can be dispensed with. In order to insure automatic closing and opening of the switch 9, the heads of its contacts 9b, 9c are preferably movable in directions (arrow 8) at right angles to the direction of film advance (arrow 7).

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended.

I claim:

1. In a cinematographic apparatus, a combination comprising a housing; guide means provided in said housing and defining a film path; film transporting means including a film transporting member movable in direction towards said film path from a first to a second position in response to removal of film from said path; electric circuit means including switch means; and operating means cooperating with and actuated by said film transporting means and cooperating with and operating said switch means in response to movement of said film transporting member from said second to said first position thereof.

2. A combination as defined in claim 1, wherein said switch means is normally open and comprises an elastic portion which biases said film transporting member to second position.

3. A combination as defined in claim 1, wherein said switch means comprises a plurality of contacts which tend to be disengaged from each other and wherein said film transporting member is arranged to move said contacts into current-conducting engagement with each other in response to movement from said second to said first position thereof.

4. A combination as defined in claim 3, wherein the number of said contacts exceeds two.

5. A combination as defined in claim 1, wherein said film transporting means further comprises electric motor means connected in said circuit means and arranged to actuate said film transporting member in closed position of said switch means.

6. A combination as defined in claim 1, wherein said apparatus is a motion picture camera having a built-in exposure control and said circuit means further comprises an element of the exposure control.

7. A combination as defined in claim 1, wherein said film transporting member is a pulldown having a claw which is movable by film from said second to said first position in response to insertion of film into said path.

8. A combination as defined in claim 1, wherein said switch means comprises at least one elastic contact which permanently biases the film transporting member to said second position.

9. A combination as defined in claim 1, wherein said guide means defines a path for 8-millimeter film.

10. A combination as defined in claim 1, wherein said apparatus is a motion picture camera having an exposure control and wherein said circuit means further comprises an element of the exposure control and the motor of said film transporting means.

11. A combination as defined in claim 1, wherein said switch means has contact means movable by said film transporting member in a first direction and wherein said film transporting means further comprises means for moving said member in a second direction substantially at right angles to said first direction.

12. A combination as defined in claim 1, wherein said apparatus is a motion picture camera having a built-in exposure control and said circuit means comprises a first branch including an element of the exposure control whose circuit is completed in response to closing of said switch means and a second branch including an electric motor for said film transporting member, said second branch further including master switch means and the circuit of said motor being completed on closing of both said switch means.